(12) United States Patent
Yang et al.

(10) Patent No.: US 12,537,445 B2
(45) Date of Patent: Jan. 27, 2026

(54) CONVERTER, CONVERTER CONTROL METHOD, AND POWER ADAPTER

(71) Applicant: Huawei Digital Power Technologies Co., Ltd., Shenzhen (CN)

(72) Inventors: Gun Yang, Dongguan (CN); Shengyong Dai, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 879 days.

(21) Appl. No.: 17/856,719

(22) Filed: Jul. 1, 2022

(65) Prior Publication Data

US 2023/0006544 A1 Jan. 5, 2023

(30) Foreign Application Priority Data

Jul. 5, 2021 (CN) .......................... 202110757059.5

(51) Int. Cl.
*H02J 7/00* (2006.01)
*H02J 7/06* (2006.01)
*H02M 3/00* (2006.01)

(52) U.S. Cl.
CPC .................. *H02M 3/01* (2021.05); *H02J 7/06* (2013.01)

(58) Field of Classification Search
None
See application file for complete search history.

(56) References Cited

U.S. PATENT DOCUMENTS

| 11,005,364 | B1 | 5/2021 | Radic |
| 2014/0111016 | A1* | 4/2014 | He .................. H02M 7/487 |
| | | | 307/82 |
| 2019/0058450 | A1 | 2/2019 | Jun et al. |
| 2019/0089250 | A1* | 3/2019 | Liu .................. H02M 3/33569 |
| 2019/0173373 | A1* | 6/2019 | Zhou .................. H02M 1/36 |
| 2021/0058002 | A1 | 2/2021 | Wong et al. |

FOREIGN PATENT DOCUMENTS

| CN | 101572490 A | 11/2009 |
| CN | 102832792 A | 12/2012 |
| CN | 105846682 A | 8/2016 |
| CN | 107017780 A | 8/2017 |
| CN | 107147296 A | 9/2017 |
| CN | 109245569 A | 1/2019 |
| CN | 109412417 A | 3/2019 |

(Continued)

*Primary Examiner* — Arun C Williams
(74) *Attorney, Agent, or Firm* — Leydig, Voit & Mayer, Ltd.

(57) ABSTRACT

The converter includes: an input direct current (DC) power supply, a main power transistor, an auxiliary power transistor, a first capacitor, a transformer, and a controller. The first capacitor is connected in series to the transformer to form a series circuit. The series circuit is connected in parallel to the auxiliary power transistor. A source of the main power transistor is connected to a drain of the auxiliary power transistor. A source of the auxiliary power transistor is connected to another electrode of the input DC power supply. An input negative electrode of the input DC power supply is grounded. The controller is configured to: monitor a value of a current on the transformer to obtain a quantity of times that the value of the current on the transformer reaches a specified current threshold.

18 Claims, 7 Drawing Sheets

(56) References Cited

FOREIGN PATENT DOCUMENTS

| | | |
|---|---|---|
| CN | 111130353 A | 5/2020 |
| CN | 111490681 A | 8/2020 |
| CN | 111525801 A | 8/2020 |
| CN | 111628654 A | 9/2020 |
| CN | 111697811 A | 9/2020 |
| CN | 111953186 A | 11/2020 |
| CN | 112803780 A | 5/2021 |
| CN | 112928924 A | 6/2021 |

\* cited by examiner

CONVERTER, CONVERTER CONTROL METHOD, AND POWER ADAPTER

CROSS-REFERENCE TO RELATED APPLICATION

This application claims priority to Chinese Patent Application No. 202110757059.5, filed on Jul. 5, 2021, which is hereby incorporated by reference in its entirety.

TECHNICAL FIELD

This application relates to the field of power electronics technologies, and in particular, to a converter, a converter control method, and a power adapter.

BACKGROUND

Currently, with increasingly strong requirements for miniaturization and fast charging of a power adapter, higher power density of the power adapter becomes a future technical development trend. The power density generally refers to a ratio of a weight/size of the power adapter to power of the power adapter. Higher power density of the power adapter indicates more power provided in a same size and also a higher loss caused by a power transistor inside the power adapter. Consequently, heat dissipation of the power adapter gradually becomes a bottleneck.

To reduce a switching loss of the power transistor, a voltage at two ends of the power transistor is usually caused to reach a valley value before the power transistor is turned on. In this case, the switching loss of the power transistor may be the smallest. To enable the power transistor to be turned on just at a valley voltage, a value of the voltage at the two ends of the power transistor needs to be monitored. In an existing solution, an auxiliary winding of a transformer may be added to monitor whether a voltage of the auxiliary winding exceeds zero. After a resonance period of specific duration is delayed, the voltage at the two ends of the power transistor at this moment is monitored. The voltage at this moment is the valley voltage. In this monitoring solution, delay duration may vary for different resonance periods. The delay duration is generated by using a resistor-capacitor RC circuit. However, the RC circuit needs to be disposed outside the power transistor, to adjust the delay duration. Therefore, a peripheral circuit of a power transistor chip is complex, and an overall size of the power adapter is increased.

In view of this, how to reduce an energy loss without increasing the overall size of the power adapter is an urgent problem to be resolved by a person skilled in the art.

SUMMARY

This application provides a converter, a converter control method, and a power adapter, to reduce an energy loss of power density without increasing an overall size of the power adapter.

According to a first aspect, this application provides a converter. The converter includes an input direct current (DC) power supply, a main power transistor, an auxiliary power transistor, a first capacitor, a transformer, and a controller. The first capacitor is connected in series to the transformer to form a series circuit. The series circuit is connected in parallel to a source and a drain of the auxiliary power transistor. A source of the main power transistor is connected to the drain of the auxiliary power transistor. A source of the main power transistor is connected to either an input positive electrode or an input negative electrode of the input DC power supply. The source of the auxiliary power transistor is connected to the other electrode of the input DC power supply. The input negative electrode of the input DC power supply is grounded. The controller is configured to: monitor a value of a current on the transformer to obtain a quantity of times that the value of the current on the transformer reaches a specified current threshold, and when the quantity of times that the value of the current on the transformer reaches the specified current threshold is N, control the main power transistor to be turned on, where N is a positive odd number.

Because an on voltage of the main power transistor is in direct proportion to an energy loss of the power transistor, to reduce a switching loss of the power transistor, a voltage at two ends of the power transistor needs to reach a valley value before the power transistor is turned on. Specifically, by observing the voltage at the two ends of the main power transistor and a current time sequence waveform of the transformer, it can be learned that a current on the transformer may exceed zero. When the current on the transformer exceeds zero for an odd number of times, the voltage at the two ends of the main power transistor reaches the valley value. Therefore, when the value of the current on the transformer reaches 0 for N times, the main power transistor is controlled to be turned on, to reduce the energy loss of the main power transistor without increasing an overall size of a power adapter.

After the auxiliary power transistor is turned off, the current on the transformer generates oscillation noise, and this affects counting of the quantity of times that the value of the current on the transformer reaches the specified current threshold. In some possible implementations, the controller is specifically configured to monitor the value of the current on the transformer after the auxiliary power transistor is turned off for specified duration. The value of the current on the transformer is monitored after the auxiliary power transistor is turned off for the specified duration, so that a noise signal in the current on the transformer can be effectively prevented from affecting the counting of the quantity of times that the value of the current on the transformer reaches the specified current threshold, to improve monitoring accuracy and reduce an energy loss of power density without increasing an overall size of the power adapter.

In some possible implementations, the transformer includes a primary-side winding and a secondary-side winding. A dotted terminal of the primary-side winding and a dotted terminal or an undotted terminal of the secondary-side winding are located on a same side. The controller is specifically configured to monitor a value of a current on the primary-side winding of the transformer. With reference to the structure in this aspect, if the dotted terminal of the primary-side winding and the undotted terminal of the secondary-side winding are located on the same side, a circuit structure of the converter in this application may be referred to as an asymmetric half bridge forward topology. If the dotted terminal of the primary-side winding and the dotted terminal of the secondary-side winding are located on the same side, a circuit structure of the converter in this application may be referred to as an asymmetric half bridge flyback topology.

Because not all magnetic lines generated by the winding on one side of the transformer can pass through the winding on the other side, leakage inductance exists. In some possible implementations, the primary-side winding includes a magnetic inductor and a leakage inductor. The controller is specifically configured to: monitor a value of a magnetic inductance current on the magnetic inductor of the primary-side winding of the transformer, or monitor a value of a leakage inductance current on the leakage inductor of the primary-side winding of the transformer. The main power transistor can be accurately controlled to be turned on by monitoring the value of the magnetic inductance current on the magnetic inductor or the value of the leakage inductance current on the leakage inductor of the primary-side winding of the transformer, to reduce the energy loss of the power density without increasing the overall size of the power adapter.

In some possible implementations, the controller specifically includes a current monitoring circuit, a quantity monitoring circuit, and a main power transistor control circuit. The current monitoring circuit is configured to monitor the value of the current on the transformer. The quantity monitoring circuit is configured to: obtain the quantity of times that the value of the current on the transformer reaches the specified current threshold, and when the quantity of times that the value of the current on the transformer reaches the specified current threshold is N, send a drive signal for the main power transistor control circuit. The main power transistor control circuit is configured to control, based on the drive signal, the main power transistor to be turned on. The current monitoring circuit may further include a specified resistor. The specified resistor is connected in series to the primary-side winding of the transformer. The current monitoring circuit can calculate the value of the current on the transformer by measuring a value of a voltage at two ends of the specified resistor.

In some possible implementations, the converter further includes a second capacitor. Two terminals of the second capacitor are respectively connected to the input positive electrode and the input negative electrode of the input DC power supply. The two terminals of the second capacitor are respectively connected to the input positive electrode and the input negative electrode of the input DC power supply. The second capacitor may be used for both the asymmetric half bridge forward topology and the asymmetric half bridge flyback topology.

According to a second aspect, this application provides a converter control method, applied to a converter. The converter includes an input DC power supply, a main power transistor, an auxiliary power transistor, a first capacitor, and a transformer.

The first capacitor is connected in series to the transformer to form a series circuit. The series circuit is connected in parallel to a source and a drain of the auxiliary power transistor. A source of the main power transistor is connected to the drain of the auxiliary power transistor. A drain of the main power transistor is connected to either an input positive electrode or an input negative electrode of the input DC power supply. The source of the auxiliary power transistor is connected to the other electrode of the input DC power supply. The input negative electrode of the input DC power supply is grounded. The method includes: monitoring a value of a current on the transformer to obtain a quantity of times that the value of the current on the transformer reaches a specified current threshold, and when the quantity of times that the value of the current on the transformer reaches the specified current threshold is N, controlling the main power transistor to be turned on, where N is a positive odd number. For a technical effect of a corresponding solution in the second aspect, refer to a technical effect that can be obtained by using the corresponding solution in the first aspect. Details are not described herein.

In some possible implementations, the monitoring a value of a current on the transformer includes: monitoring the value of the current on the transformer after the auxiliary power transistor is turned off for specified duration.

According to a third aspect, this application provides a power adapter, including the converter according to any one of the first aspect. The power adapter further includes an alternating current-to-direct current (AC/DC) conversion circuit and a filter circuit. The filter circuit is separately connected to the AC/DC conversion circuit and the converter. The AC/DC conversion circuit is configured to convert an alternating current in a power grid into a direct current. The converter is configured to provide a DC voltage for a load device. The filter circuit is configured to filter out noise in the input DC power supply and the converter. For a technical effect of a corresponding solution in the third aspect, refer to a technical effect that can be obtained by using the corresponding solution in the first aspect. Details are not described herein.

According to a fourth aspect, this application provides a converter. The converter includes an input DC power supply, a main power transistor, an auxiliary power transistor, a first capacitor, a transformer, and a controller. A drain of the main power transistor is connected to one end of the transformer. A source of the main power transistor is connected to either an input positive electrode or an input negative electrode of the input DC power supply. The other end of the transformer is connected to the other electrode of the input DC power supply. The first capacitor is connected in series to the auxiliary power transistor to form a series circuit. The series circuit is connected in parallel to the two ends of the transformer. The controller is configured to: monitor a value of a current on the transformer to obtain a quantity of times that the value of the current on the transformer reaches a specified current threshold, and when the quantity of times that the value of the current on the transformer reaches the specified current threshold is N, control the main power transistor to be turned on, where N is a positive odd number. For a technical effect of a corresponding solution in the fourth aspect, refer to a technical effect that can be obtained by using the corresponding solution in the first aspect. Details are not described herein.

In some possible implementations, the controller is specifically configured to monitor the value of the current on the transformer after the auxiliary power transistor is turned off for specified duration.

In some possible implementations, the transformer includes a primary-side winding and a secondary-side winding. A dotted terminal of the primary-side winding and an undotted terminal of the secondary-side winding are located on a same side. The controller is specifically configured to monitor a value of a current on the primary-side winding of the transformer.

In some possible implementations, the primary-side winding includes a magnetic inductor and a leakage inductor. The controller is specifically configured to: monitor a value of a magnetic inductance current on the magnetic inductor of the primary-side winding of the transformer, or monitor a value of a leakage inductance current on the leakage inductor of the primary-side winding of the transformer.

In some possible implementations, the controller specifically includes a current monitoring circuit, a quantity monitoring circuit, and a main power transistor control circuit. The current monitoring circuit is configured to monitor the value of the current on the transformer. The quantity monitoring circuit is configured to: obtain the quantity of times that the value of the current on the transformer reaches the specified current threshold, and when the quantity of times that the value of the current on the transformer reaches the specified current threshold is N, send a drive signal for the main power transistor control circuit. The main power transistor control circuit is configured to control, based on the drive signal, the main power transistor to be turned on.

In some possible implementations, the converter further includes a second capacitor.

Two terminals of the second capacitor are respectively connected to the input positive electrode and the input negative electrode of the input DC power supply.

According to a fifth aspect, this application provides a converter control method, applied to a converter. The converter includes an input DC power supply, a main power transistor, an auxiliary power transistor, a first capacitor, and a transformer.

A drain of the main power transistor is connected to one end of the transformer. A source of the main power transistor is connected to either an input positive electrode or an input negative electrode of the input DC power supply. The other end of the transformer is connected to the other electrode of the input DC power supply. The first capacitor is connected in series to the auxiliary power transistor to form a series circuit. The series circuit is connected in parallel to the two ends of the transformer. The method includes: monitoring a value of a current on the transformer to obtain a quantity of times that the value of the current on the transformer reaches a specified current threshold, and when the quantity of times that the value of the current on the transformer reaches the specified current threshold is N, controlling the main power transistor to be turned on, where N is a positive odd number. For a technical effect of a corresponding solution in the fifth aspect, refer to a technical effect that can be obtained by using the corresponding solution in the fourth aspect. Details are not described herein.

In some possible implementations, the monitoring a value of a current on the transformer includes:

monitoring the value of the current on the transformer after the auxiliary power transistor is turned off for specified duration.

According to a sixth aspect, this application provides a power adapter, including the converter according to any one of the fourth aspect. The power adapter further includes an AC/DC conversion circuit and a filter circuit. The filter circuit is separately connected to the AC/DC conversion circuit and the converter. The AC/DC conversion circuit is configured to convert an alternating current in a power grid into a direct current. The converter is configured to provide a DC voltage for a load device. The filter circuit is configured to filter out noise in the input DC power supply and the converter. For a technical effect of a corresponding solution in the sixth aspect, refer to a technical effect that can be obtained by using the corresponding solution in the fourth aspect. Details are not described herein.

These aspects or other aspects of this application are clearer and more comprehensible in descriptions of the following embodiments.

DESCRIPTION OF EMBODIMENTS

The following describes embodiments of this application with reference to the accompanying drawings. It is clear that the described embodiments are merely some rather than all of embodiments of this application. A person of ordinary skill in the art may learn that the technical solutions provided in embodiments of this application are also applicable to a similar technical problem as a technology evolves and a new scenario emerges.

In addition, it should be understood that in the descriptions of this application, terms such as "first" and "second" are only used for description differentiation, but cannot be understood as indication or implication of relative importance and cannot be understood as indication or implication of sequences; "and/or describes an association relationship for describing associated objects, and represents that three relationships may exist. For example, A and/or B may represent the following cases: Only A exists, both A and B exist, and only B exists. The character "/" generally indicates an "or" relationship between associated objects; "a plurality of" means two or more.

The following describes some terms in embodiments of this application to help a person skilled in the art have a better understanding.

(1) Magnetic inductance is an equivalent inductance value. Actually, a magnetic inductor is a primary-side inductor of a transformer, and a current on the inductor is not conducted to a secondary side. The inductor functions to generate excitation effect on an iron core, so that ferromagnetic molecules in the iron core can be used for conducting magnetism.

(2) Leakage inductance: Not all magnetic lines generated on a primary side can pass through a secondary coil. Therefore, an inductor that generates magnetic leakage is referred to as a leakage inductor. Specifically, the leakage inductance refers to a part of flux that is leaked in a coupling process of the primary side of the transformer.

With development of consumer electronics, consumers have increasingly strong requirements for miniaturization and fast charging of an adapter. Higher power density of the adapter becomes a future technical development trend. Higher power density indicates more power provided in a same size and also a higher loss. Consequently, heat dissipation gradually becomes a bottleneck.

Figure 1:
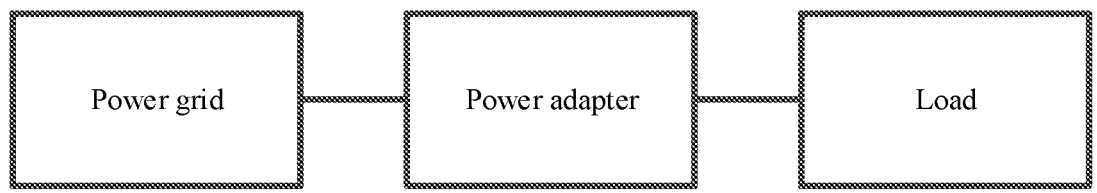
FIG. 1 is a schematic topology diagram of a power adapter.

As shown in FIG. 1, one end of a power adapter is connected to a power grid, and the other end is connected to a load. The power grid may be a mains network provided for residents, for example, 220 V. The load may be various types of electronic devices, for example, a mobile phone, a tablet computer, a notebook computer, and a wearable device. There may be a plurality of types of power adapters, power adapters corresponding to different types of electronic devices may not have a same structure, and power adapters of electronic devices of a same type may also be different. This is not specifically limited in this application.

In a possible implementation, to reduce a switching loss of a power transistor in the power adapter, a voltage at two ends of the power transistor is usually caused to reach a valley value before the power transistor is turned on. In this case, the switching loss may be the smallest. To enable the power transistor to be turned on (closed) just at a valley voltage, a value of the voltage at the two ends of the power transistor needs to be monitored. For example, an auxiliary winding of a transformer may be added to monitor whether a voltage of the auxiliary winding exceeds zero. After a specified resonance period is delayed, the voltage at the two ends of the power transistor at this moment is monitored. The voltage at this moment is the valley voltage. However, in this method, different delay duration may be set for different resonance periods. Generally, the delay duration needs to be generated by using a resistor-capacitor circuit. A resistor needs to be disposed outside a chip on which the power transistor is located, to adjust the delay duration. Therefore, a peripheral circuit of the chip is complex, and an additional auxiliary winding of the transformer needs to be added. This increases a size of the transformer.

In view of this, an embodiment of this application provides a converter, a converter control method, and a power adapter, to reduce an energy loss of power density without increasing an overall size of the power adapter.

Figure 2:
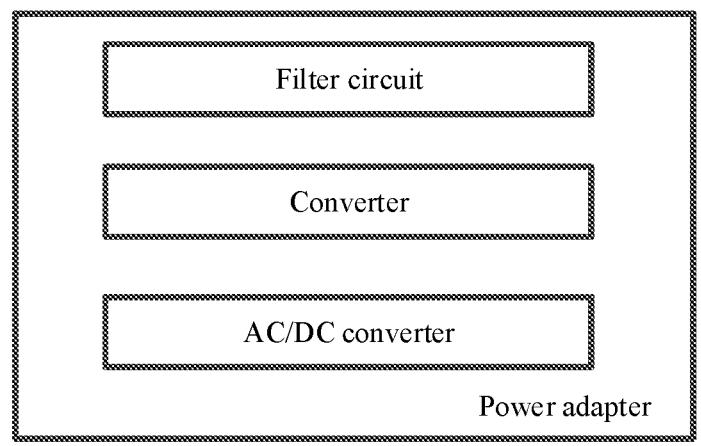
FIG. 2 is a schematic diagram of a structure a power adapter.

The following describes an internal structure of the power adapter. FIG. 2 is a schematic diagram of a structure of a possible power adapter. As shown in FIG. 2, the power adapter includes an AC/DC conversion circuit, a converter, and a filter circuit. The filter circuit is separately connected to the AC/DC conversion circuit and the converter. The AC/DC conversion circuit is configured to convert an alternating current in a power grid into a direct current. The converter is configured to provide a DC voltage for a load. The filter circuit is configured to filter out noise in an input DC power supply and the converter. A person skilled in the art does not impose too many limitations on specific functions and structures of the AC/DC conversion circuit and the filter circuit, which should be understood by a person skilled in the art.

Figure 3:
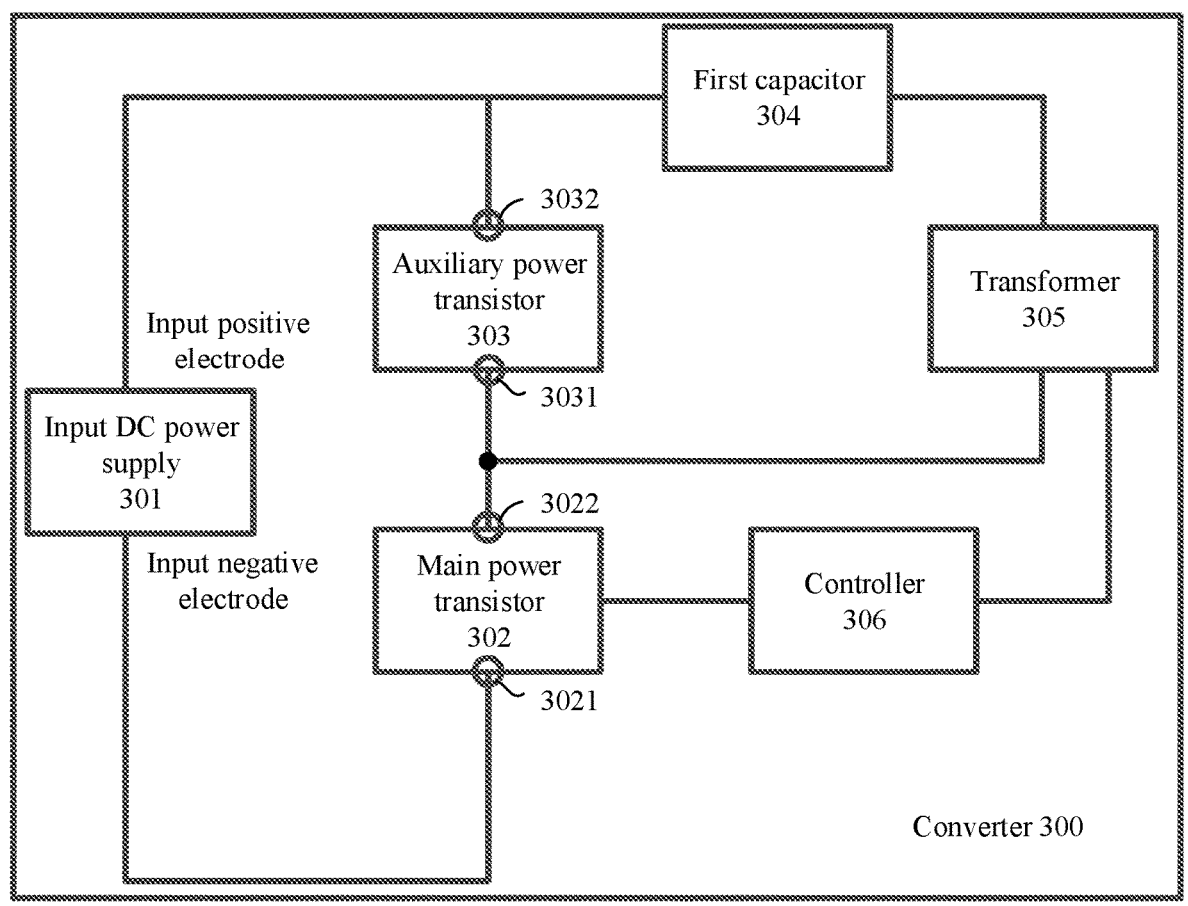
FIG. 3 is a schematic diagram of a structure of a converter.

The following describes a converter provided in an embodiment of this application with reference to FIG. 3. FIG. 3 is a schematic diagram of a structure of a converter according to this application. As shown in FIG. 3, a converter 300 includes an input DC power supply 301, a main power transistor 302, an auxiliary power transistor 303, a first capacitor 304, a transformer 305, and a controller 306. The first capacitor 304 is connected in series to the transformer 305 to form a series circuit. The series circuit is connected in parallel to a source 3031 and a drain 3032 of the auxiliary power transistor 303. A source 3021 of the main power transistor 302 is connected to the drain 3032 of the auxiliary power transistor 303. A drain 3022 of the main power transistor 302 is connected to either an input positive electrode or an input negative electrode of the input DC power supply 301. The source 3031 of the auxiliary power transistor 303 is connected to the other electrode of the input DC power supply 301. The input negative electrode of the input DC power supply 301 is grounded.

The controller 306 is configured to: monitor a value of a current on the transformer 305 to obtain a quantity of times that the value of the current on the transformer 305 reaches a specified current threshold, and when the quantity of times that the value of the current on the transformer 305 reaches the specified current threshold is N, control the main power transistor 302 to be turned on, where N is a positive odd number.

Optionally, the controller 306 may be a general-purpose central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The controller may implement or execute various example logical blocks, modules, and circuits described with reference to content disclosed in this application. The processor may be a combination of processors implementing a computing function, for example, a combination including one or more microprocessors, or a combination of a DSP and a microprocessor.

The input DC power supply 301 is configured to provide a DC voltage for a device in the converter 300. The main power transistor 302 or the auxiliary power transistor 303 may be one or more of a plurality of types of switching devices such as a metal-oxide-semiconductor field-effect transistor (MOSFET), a bipolar junction transistor (BJT), an insulated gate bipolar transistor (IGBT), and gallium nitride (GaN). Examples are not described one by one in this embodiment of this application. Each switching device may include a first electrode, a second electrode, and a control electrode, where the control electrode is configured to control turn-on or turn-off of a switch. When the switch is turned on, a current may be transmitted between a first electrode and a second electrode of the switch. When the switch is turned off, a current cannot be transmitted between the first electrode and the second electrode of the switch. The MOSFET is used as an example. A control electrode of the switch is a gate. The first electrode of the switch may be a source of the switching device, and the second electrode may be a drain of the switching device. Alternatively, the first electrode may be a drain of the switch, and the second electrode may be a source of the switch. The input DC power supply 301 in this application includes an input positive electrode and an input negative electrode. In the converter 300, the source 3021 of the main power transistor 302 may be connected to the input negative electrode, and the drain 3031 of the auxiliary power transistor 303 may also be connected to the input negative electrode. In this embodiment of this application, a structure formed by combining the main power transistor 302, the auxiliary power transistor 303, and the transformer 305 may also be referred to as an asymmetrical half bridge topology structure.

In this application, after the auxiliary power transistor 303 is turned off, the first capacitor 304 is configured to resonate with an inductor in the transformer 305 and parasitic capacitors in the main power transistor 302 and the auxiliary power transistor 303. In an operating process of the converter 300, the main power transistor 302 and the auxiliary power transistor 303 are turned on at different moments, and may be turned off at the same time. A time period in which the main power transistor 302 and the auxiliary power transistor 303 are turned off at the same time is referred to as dead time. The main power transistor 302 and the auxiliary power transistor 303 may be controlled to be turned on to drive the converter 300 to operate properly.

In this application, the specified current threshold may be a current threshold obtained through repeated tests. The specified current threshold may be 0, or may be a value close to 0, or may be another value. A value of the specified current threshold is related to a specific circuit structure of the converter 300. Optionally, the specified current threshold may be a small value, and may be a value of a current at a point on the transformer 305. After the auxiliary power transistor 303 is turned off this time and before the main power transistor is turned on, the quantity of times N that the current on the transformer 305 reaches the specified current threshold is counted, where a value of the quantity of times N may be a positive odd number (1, 3, 5 . . . ).

Figure 4:
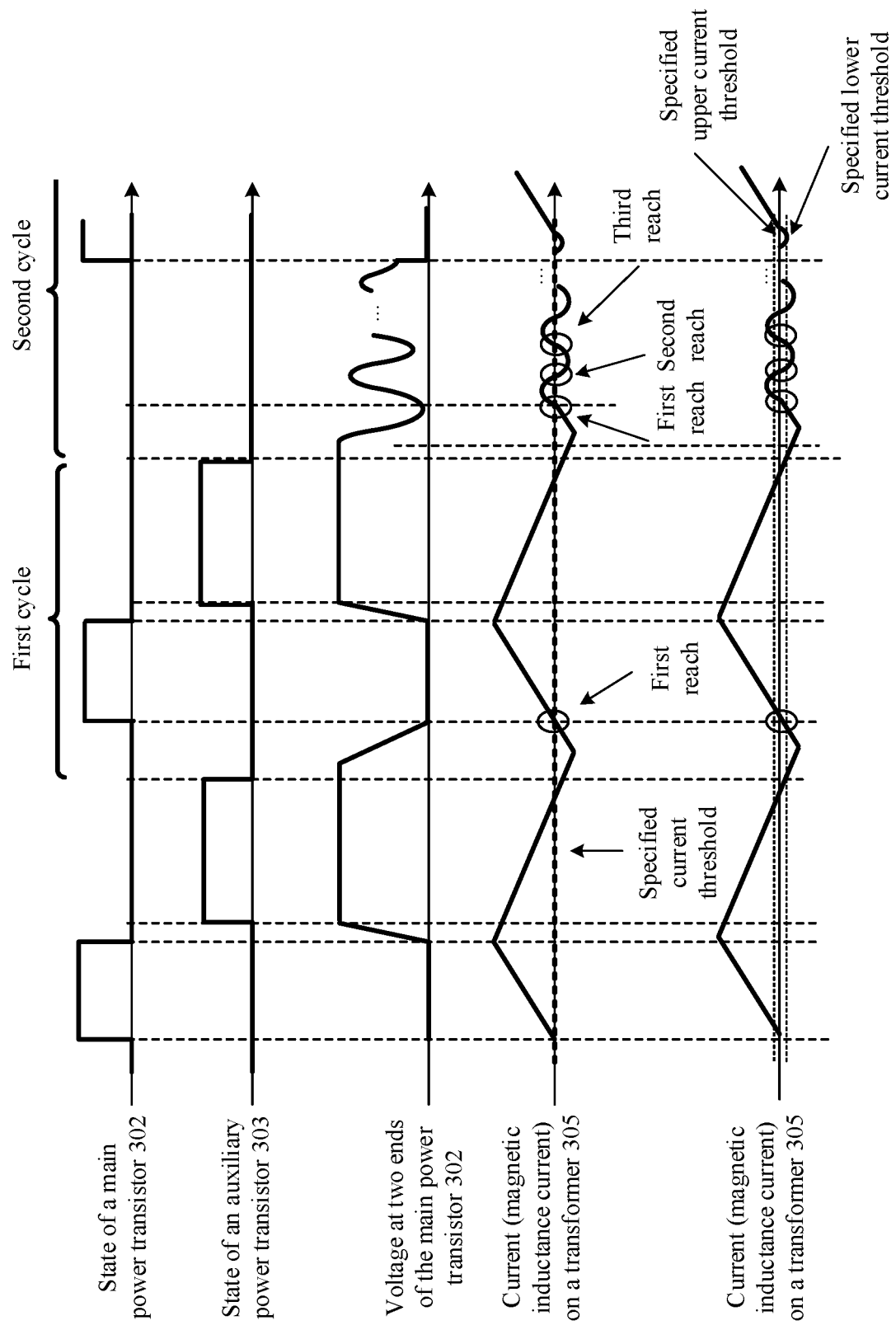
FIG. 4 is a schematic diagram of an operating time sequence of a converter, a voltage at two ends of a main power transistor, and an operating waveform of a current of a transformer.

For description of an operating time sequence of the converter 300 and an operating waveform of a voltage at two ends of the main power transistor 302 in this application, refer to a time sequence diagram shown in FIG. 4. As shown in FIG. 4, in the foregoing operating time sequence, the main power transistor 302 and the auxiliary power transistor 303 are in an on or off state in different time periods. The main power transistor 302 and the auxiliary power transistor 303 are turned on or off, and this affects a value of the voltage at the two ends of the main power transistor 302 and the value of the current on the transformer 305 (herein, a magnetic inductance current is used as an example). The voltage at the two ends of the main power transistor 302 is related to a waveform of the value of the current on the transformer. In this application, time in which the main power transistor 302 is turned on once and the auxiliary power transistor 303 is turned on once is set as a cycle.

An objective of this application is to turn on the main power transistor 302 when the voltage at the two ends of the main power transistor 302 is 0 or close to 0, to implement valley-bottom or zero-voltage conduction. For example, still refer to FIG. 4. In this embodiment, when the specified current threshold is 0, the value of the quantity of times N may be a positive odd number. In a first cycle shown in FIG. 4, when the current on the transformer 305 reaches the specified current threshold for the first time (the odd time), the voltage at the two ends of the main power transistor 302 is 0 or close to 0. In a second cycle shown in the figure, when the current on the transformer reaches the specified current threshold for the first time and the third time (the odd time), the voltage at the two ends of the main power transistor 302 is also 0 or close to 0.

Still refer to FIG. 4. The specified current threshold may alternatively be a current interval. To be specific, the specified current threshold further includes a specified upper current threshold and a specified lower current threshold. That the current on the transformer 305 completely passes through the current interval each time may be considered as that the current on the transformer reaches the specified upper current threshold and the specified lower current threshold. Therefore, when the current on the transformer 305 reaches the specified current threshold for the second time and the sixth time, the voltage at the two ends of the main power transistor 302 is 0 or close to 0.

In this application, an on voltage of the main power transistor 302 is in direct proportion to an energy loss. Therefore, when the quantity of times that the value of the current on the transformer 305 reaches the specified current threshold is N, the main power transistor 302 is controlled to be turned on, so that the main power transistor 302 operates. Therefore, if the main power transistor 302 is turned on at a voltage of 0 or at a low voltage, the energy loss of the converter is the smallest. Therefore, an energy loss of the main power transistor 302 can be reduced by using the converter 300 provided in this application, to reduce an energy loss of power density without increasing an overall size of a power adapter.

After the auxiliary power transistor 303 is turned off, the current on the transformer 305 generates oscillation noise, and this affects counting of the quantity of times that the value of the current on the transformer 305 reaches the specified current threshold. In view of this, in some possible implementations, when a current on a leakage inductor of the transformer 305 is monitored, the controller 306 is specifically configured to monitor the value of the current on the transformer 305 after the auxiliary power transistor 303 is turned off for specified duration.

The specified duration may be delay duration obtained through repeated tests. A value of the specified duration may also be related to a specific circuit structure of the converter 300. This is not specifically limited herein. The specified duration is also referred to as blank time. The value of the current on the transformer 305 is monitored after the auxiliary power transistor 303 is turned off for the specified duration, so that a noise signal on the current on the transformer 305 can be effectively prevented from affecting the counting of the quantity of times that the value of the current on the transformer 305 reaches the specified current threshold, to improve monitoring accuracy and reduce the energy loss of the power density without increasing the overall size of the power adapter.

In a possible implementation, the transformer 305 includes a primary-side winding and a secondary-side winding. A dotted terminal of the primary-side winding and a dotted terminal or an undotted terminal of the secondary-side winding are located on a same side. The controller 306 is specifically configured to monitor a value of a current on the primary-side winding of the transformer 305.

Figure 5:
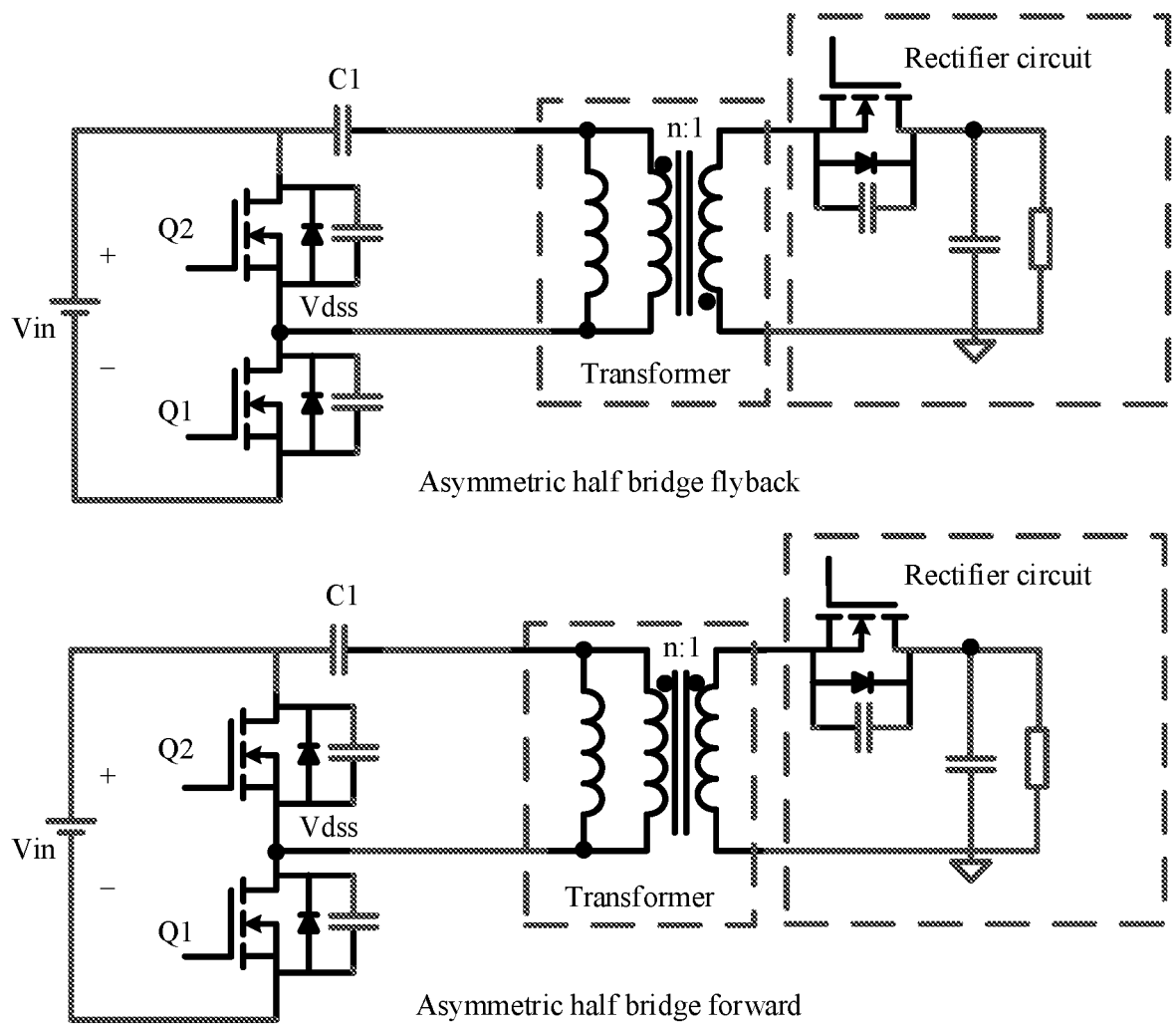
FIG. 5 is a schematic diagram of a circuit structure of a converter.

FIG. 5 is a schematic diagram of a circuit structure of a converter. Q1 is a main power transistor, Q2 is an auxiliary power transistor, C1 is a first capacitor, and Vin is a voltage output by an input DC power supply. "+" is an input positive electrode, "−" is an input negative electrode, and Vdss is a voltage of the main power transistor. The controller 306 may be connected to a gate of the main power transistor Q1, to control turn-on or turn-off of the main power transistor Q1. In the upper half part of FIG. 5, a series circuit formed by the transformer and the first capacitor C1 is connected in parallel to a source and a drain of the auxiliary power transistor Q2. The drain of the auxiliary power transistor Q2 is connected to the positive electrode. A source of the main power transistor Q1 is connected to the negative electrode. A drain of the main power transistor Q1 is connected to the source of the auxiliary power transistor Q2. The transformer includes a primary-side winding and a secondary-side winding. A dotted terminal of the primary-side winding is connected to the first capacitor C1. A dotted terminal of the secondary-side winding is grounded. In the lower half part of FIG. 5, a series circuit formed by the transformer and the first capacitor C1 is connected in parallel to a source and a drain of the auxiliary power transistor Q2. The drain of the auxiliary power transistor Q2 is connected to the positive electrode. A source of the main power transistor Q1 is connected to the negative electrode. A drain of the main power transistor Q1 is connected to the source of the auxiliary power transistor Q2. The transformer includes a primary-side winding and a secondary-side winding. A dotted terminal of the primary-side winding is connected to the first capacitor C1. An undotted terminal of the secondary-side winding is grounded.

With reference to the structure in this embodiment of this application, if the dotted terminal of the primary-side winding and the undotted terminal of the secondary-side winding are located on a same side, a circuit structure of the converter 300 in this application may be referred to as an asymmetric half bridge forward topology. If the dotted terminal of the primary-side winding and the dotted terminal of the secondary-side winding are located on a same side, a circuit structure of the converter 300 in this application may be referred to as an asymmetric half bridge flyback topology. In addition, FIG. 5 further shows a rectifier circuit. The rectifier circuit is connected to the secondary-side winding of the transformer 305. The rectifier circuit is configured to rectify a current output by the transformer 305.

Figure 6:
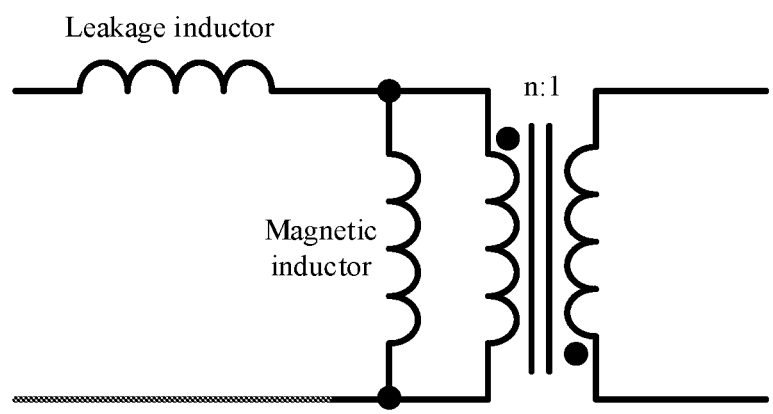
FIG. 6 is a schematic diagram of a structure of a transformer.
Figure 7:
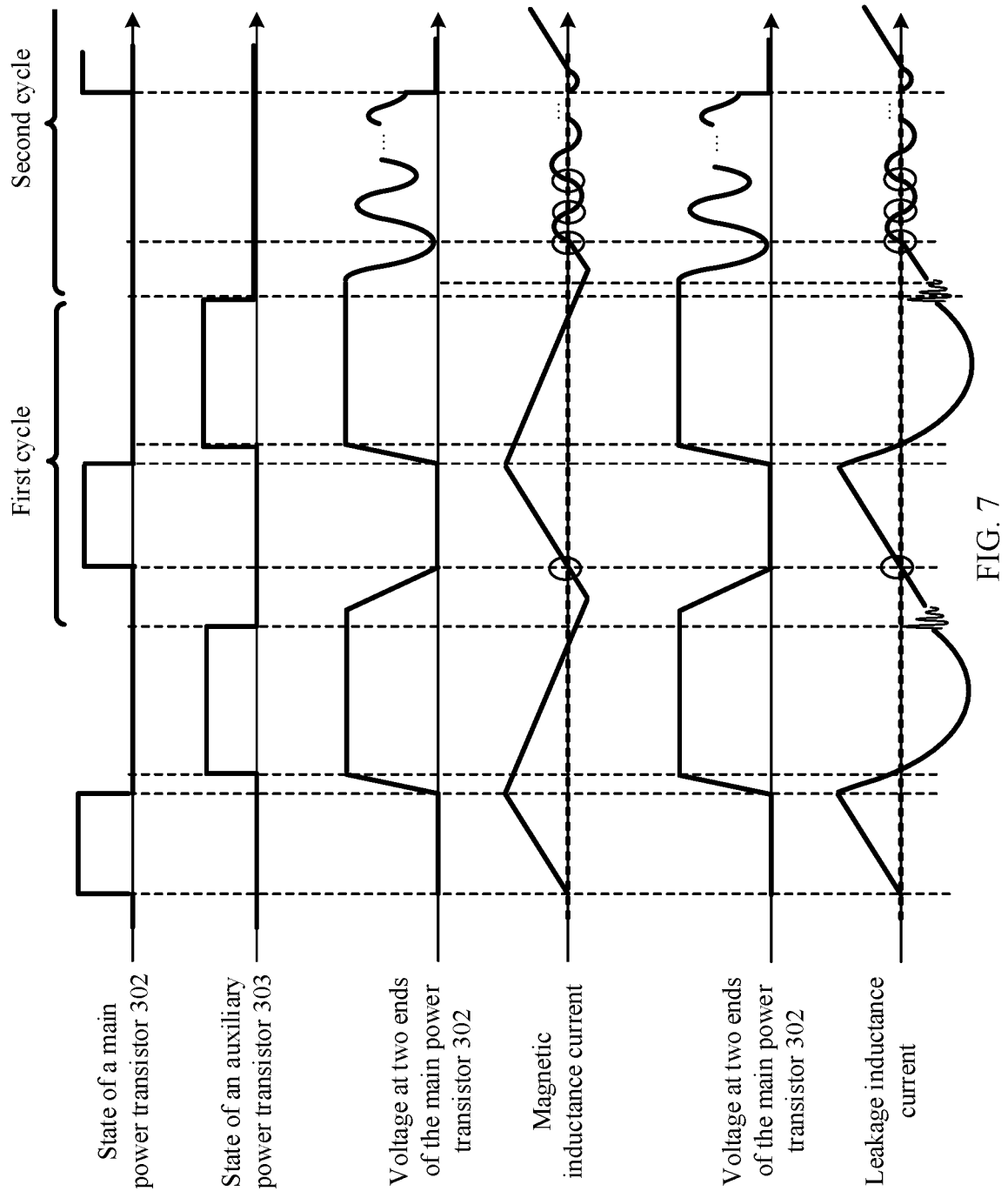
FIG. 7 is a schematic diagram of an operating time sequence of a converter and an operating waveform of a voltage at two ends of a main power transistor and a magnetic inductor and a leakage inductor of a transformer.

FIG. 6 is a schematic diagram of a structure of a transformer. As shown in FIG. 6, because not all magnetic lines generated by a winding on one side of the transformer 305 can pass through a winding on the other side, leakage inductance exists. In a possible implementation, the primary-side winding includes a magnetic inductor and a leakage inductor. The controller 306 is specifically configured to: monitor a value of a magnetic inductance current on the magnetic inductor of the primary-side winding of the transformer 305, or monitor a value of a leakage inductance current on the leakage inductor of the primary-side winding of the transformer 305. Based on the magnetic inductor and the leakage inductor, FIG. 7 shows an operating time sequence of the converter 300 in this application and an operating waveform of the voltage at the two ends of the main power transistor 302 and the magnetic inductor and the leakage inductor of the transformer 305. As shown in FIG. 7, in the operating time sequence, the main power transistor 302 and the auxiliary power transistor 303 are in an on or off state in different time periods. The main power transistor 302 and the auxiliary power transistor 303 are turned on or off, and this affects a value of the voltage at the two ends of the main power transistor 302 and the value of the current on the transformer 305. The voltage at the two ends of the main power transistor 302 is related to a waveform of the current on the magnetic inductor and a waveform of the current on the leakage inductor.

Still refer to FIG. 7. In this embodiment, when the specified current threshold is 0, the value of the quantity of times N may be a positive odd number. In a first cycle, when the current on the magnetic inductor reaches the specified current threshold for the first time, the voltage at the two ends of the main power transistor 302 is 0 or close to 0. In a second cycle, when the current on the magnetic inductor reaches the specified current threshold for the first time and the third time, the voltage at the two ends of the main power transistor 302 is also 0 or close to 0. Similarly, in the first cycle, when the current on the leakage inductor reaches the specified current threshold for the first time, the voltage at the two ends of the main power transistor 302 is 0 or close to 0. In the second cycle, when the current on the leakage inductor reaches the specified current threshold for the first time and the third time, the voltage at the two ends of the main power transistor 302 is also 0 or close to 0. Therefore, in this embodiment of this application, the main power transistor 302 can be accurately controlled to be turned on by monitoring the value of the magnetic inductance current on the magnetic inductor or the value of the leakage inductance current on the leakage inductor of the primary-side winding of the transformer 305, to reduce the energy loss of the power density without increasing the overall size of the power adapter.

Figure 8A:
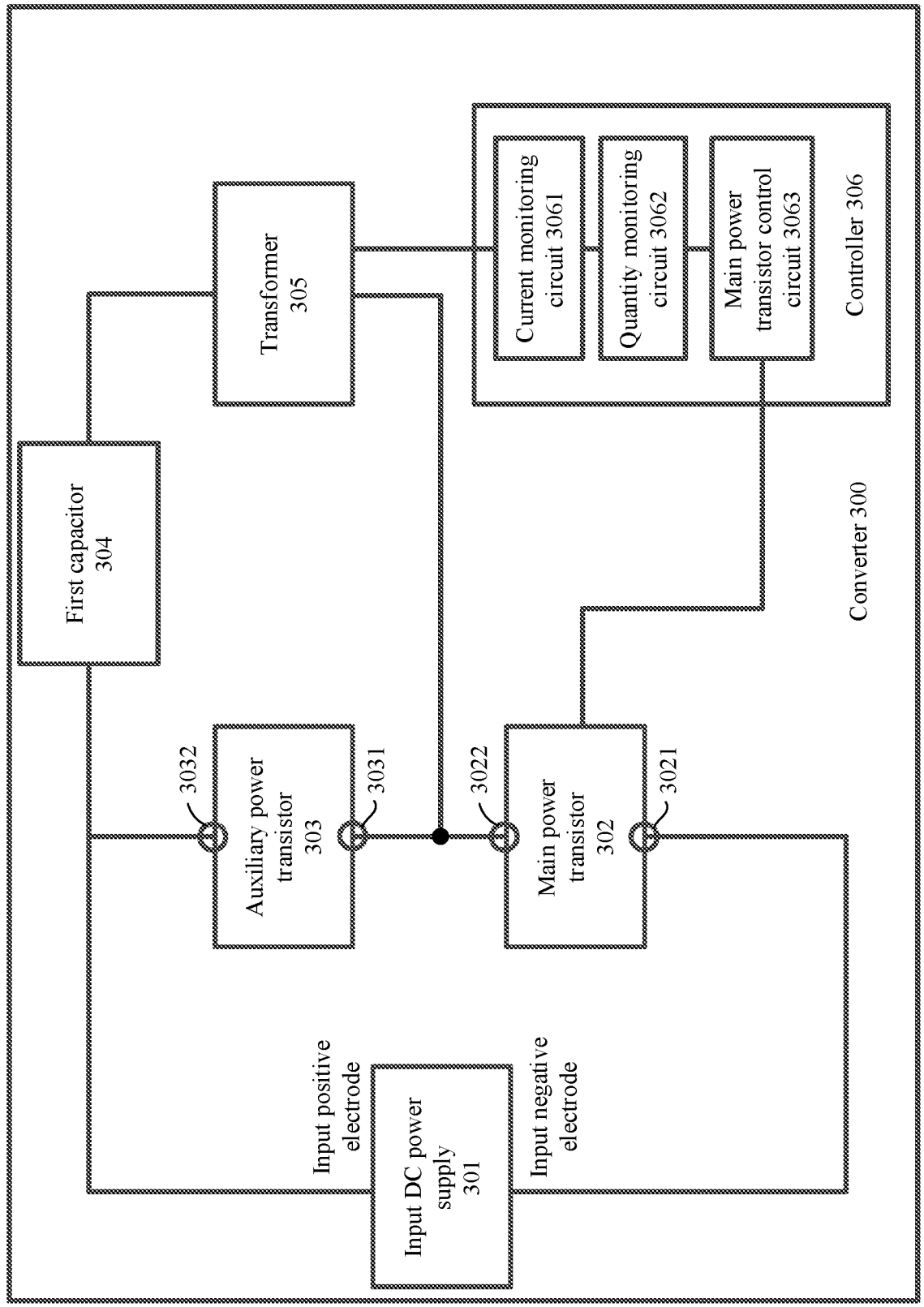
FIG. 8A is a schematic diagram of a specific structure of a controller.

FIG. 8A is a schematic diagram of a specific structure of the controller 306. In a possible implementation, as shown in FIG. 8A, the controller 306 specifically includes a current monitoring circuit 3061, a quantity monitoring circuit 3062, and a main power transistor control circuit 3063. The current monitoring circuit 3061 is configured to monitor the value of the current on the transformer 305. The quantity monitoring circuit 3062 is configured to: obtain the quantity of times that the value of the current on the transformer 305 reaches the specified current threshold, and when the quantity of times that the value of the current on the transformer 305 reaches the specified current threshold is N, send a drive signal for the main power transistor control circuit 3063. The main power transistor control circuit 3063 is configured to control, based on the drive signal, the main power transistor to be turned on.

Figure 8B:
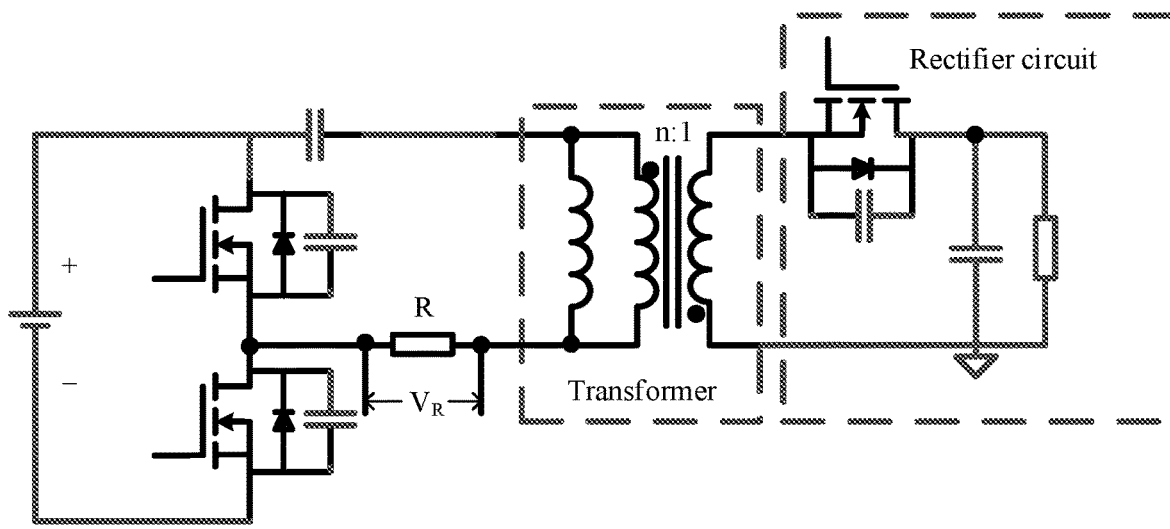
FIG. 8B is a schematic diagram of a structure of a current monitoring circuit.

FIG. 8B is a schematic diagram of a specific structure of the current monitoring circuit 3061. As shown in FIG. 8B, the current monitoring circuit 3061 may further include a specified resistor R. The specified resistor R is connected in series to the primary-side winding of the transformer 305. The current monitoring circuit 3061 can calculate the value of the current on the transformer 305 by measuring a value $V_R$ of a voltage at two ends of the specified resistor. In addition, there may be multiple manners of monitoring the current on the transformer 305. This is not specifically limited herein, and should be known by a person skilled in the art.

The quantity monitoring circuit 3062 may count, by using a comparator, the quantity of times that the value of the current on the transformer 305 in this application reaches the specified current threshold. The drive signal in this application may alternatively be a pulse width modulation (PWM) signal. A specific manner of generating the drive signal is not specifically limited herein, and should be known by a person skilled in the art.

In a possible implementation, the converter 305 further includes a second capacitor. Two terminals of the second capacitor are respectively connected to the input positive electrode and the input negative electrode of the input DC power supply.

Optionally, the circuit diagram shown in FIG. 5 may further include a second capacitor. Two terminals of the second capacitor are respectively connected to the input positive electrode and the input negative electrode of the input DC power supply 301. The circuit shown in FIG. 5 may be used for an asymmetric half bridge forward topology or an asymmetric half bridge flyback topology. In addition, the converter in the foregoing solution provided in this application is not limited to the asymmetric half bridge forward/flyback topology shown in FIG. 5. In this application, the converter 300 provided in the foregoing embodiment may be used for a power adapter, and this embodiment of this application may also be used for a charging or electric energy conversion product, for example, a base station power supply, an in-vehicle power supply, or another product related to DC/DC conversion control.

The foregoing descriptions are merely specific implementations of the embodiments of this application, but are not intended to limit the protection scope of the embodiments of this application.

An embodiment of this application further provides a converter control method, applied to a converter. The converter includes an input DC power supply, a main power transistor, an auxiliary power transistor, a first capacitor, and a transformer.

The first capacitor is connected in series to the transformer to form a series circuit. The series circuit is connected in parallel to a source and a drain of the auxiliary power transistor. A source of the main power transistor is connected to the drain of the auxiliary power transistor. A drain of the main power transistor is connected to either an input positive electrode or an input negative electrode of the input DC power supply. The source of the auxiliary power transistor is connected to the other electrode of the input DC power supply. The input negative electrode of the input DC power supply is grounded. The method includes: monitoring a value of a current on the transformer to obtain a quantity of times that the value of the current on the transformer reaches a specified current threshold, and when the quantity of times that the value of the current on the transformer reaches the specified current threshold is N, controlling the main power transistor to be turned on, where N is a positive odd number.

Figure 9:
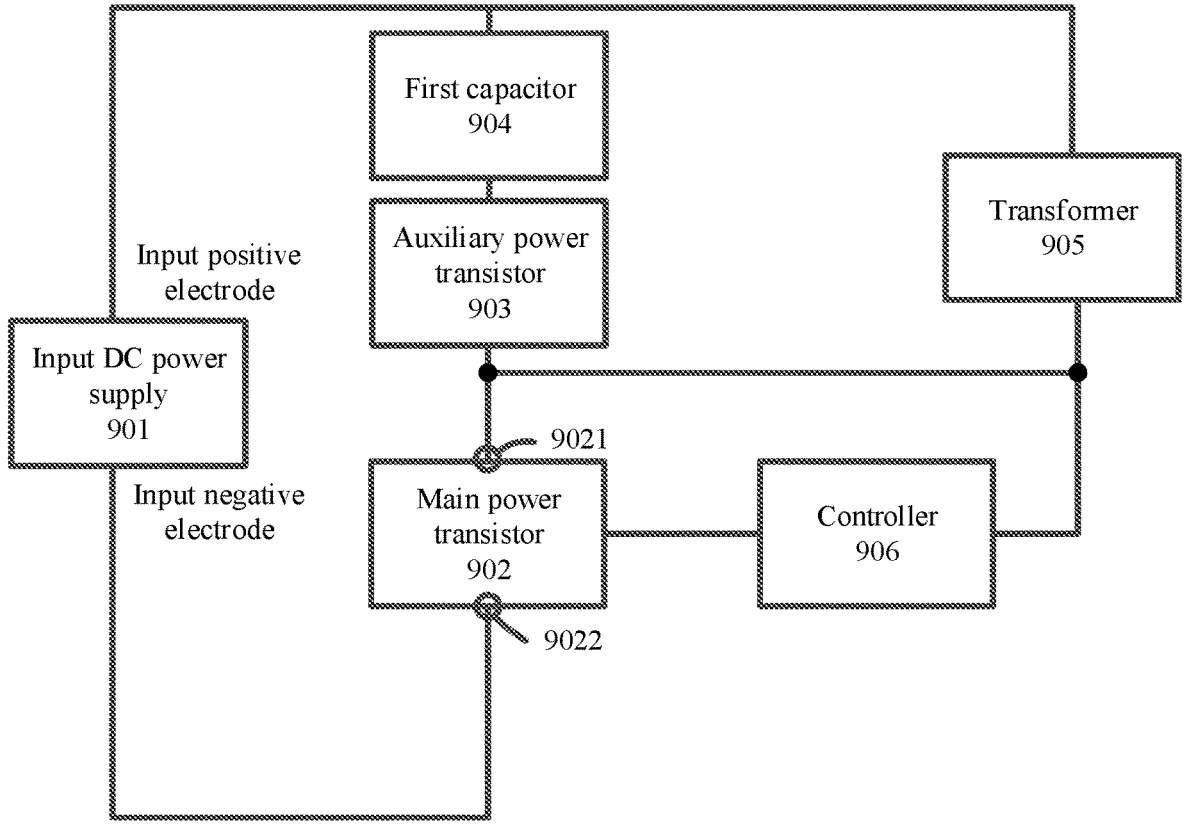
FIG. 9 is a schematic diagram of a structure of another converter.

In addition, this application provides another converter. The following describes a converter provided in an embodiment of this application with reference to FIG. 9. FIG. 9 is a schematic diagram of a structure of another converter according to this application. As shown in FIG. 9, a converter 900 includes an input DC power supply 901, a main power transistor 902, an auxiliary power transistor 903, a first capacitor 904, a transformer 905, and a controller 906.

A drain 9021 of the main power transistor 902 is connected to one end of the transformer 905. A source 9022 of the main power transistor 902 is connected to either an input positive electrode or an input negative electrode of the input DC power supply 901. The other end of the transformer 905 is connected to the other electrode of the input DC power supply 901. The first capacitor 904 is connected in series to the auxiliary power transistor 903 to form a series circuit. The series circuit is connected in parallel to the two ends of the transformer 905. The controller 906 is configured to: monitor a value of a current on the transformer 905 to obtain a quantity of times that the value of the current on the transformer 905 reaches a specified current threshold, and when the quantity of times that the value of the current on the transformer 905 reaches the specified current threshold is N, control the main power transistor 902 to be turned on, where N is a positive odd number. In this embodiment of this application, a structure formed by combining the main power transistor 902, the auxiliary power transistor 903, and the transformer 905 may be referred to as an active clamp topology.

In a possible implementation, the controller 906 is specifically configured to monitor the value of the current on the transformer 905 after the auxiliary power transistor 903 is turned off for specified duration.

In a possible implementation, the transformer 905 includes a primary-side winding and a secondary-side winding. A dotted terminal of the primary-side winding and an undotted terminal of the secondary-side winding are located on a same side. The controller 906 is specifically configured to monitor a value of a current on the primary-side winding of the transformer 905.

In a possible implementation, the primary-side winding includes a magnetic inductor and a leakage inductor. The controller 906 is specifically configured to: monitor a value of a magnetic inductance current on the magnetic inductor of the primary-side winding of the transformer 905, or monitor a value of a leakage inductance current on the leakage inductor of the primary-side winding of the transformer 905.

In a possible implementation, the controller 906 specifically includes a current monitoring circuit, a quantity monitoring circuit, and a main power transistor control circuit. The current monitoring circuit is configured to monitor the value of the current on the transformer 905. The quantity monitoring circuit is configured to: obtain the quantity of times that the value of the current on the transformer 905 reaches the specified current threshold, and when the quantity of times that the value of the current on the transformer 905 reaches the specified current threshold is N, send a drive signal for the main power transistor 902 control circuit. The main power transistor control circuit is configured to control, based on the drive signal, the main power transistor 902 to be turned on.

In a possible implementation, the converter 900 further includes a second capacitor. Two terminals of the second capacitor are respectively connected to the input positive electrode and the input negative electrode of the input DC power supply 901.

The converter 900 in the foregoing solution provided in this application may be used for the active clamp topology. A structure difference between FIG. 9 and FIG. 3 lies in a specific connection manner of the first capacitor. In FIG. 3, the first capacitor and the transformer form the series circuit, and the series circuit is connected in parallel to the auxiliary power transistor. However, in FIG. 9, the first capacitor and the auxiliary power transistor form a series circuit, and the transformer is connected in parallel to two ends of the series circuit. For beneficial effects of this embodiment, refer to the foregoing descriptions. This is not specifically limited herein.

An embodiment of this application further provides a converter control method, applied to a converter. The converter includes an input DC power supply, a main power transistor, an auxiliary power transistor, a first capacitor, and a transformer.

A drain of the main power transistor is connected to one end of the transformer. A source of the main power transistor is connected to either an input positive electrode or an input negative electrode of the input DC power supply. The other end of the transformer is connected to the other electrode of the input DC power supply. The first capacitor is connected in series to the auxiliary power transistor to form a series circuit. The series circuit is connected in parallel to the two ends of the transformer. The method includes:

monitoring a value of a current on the transformer to obtain a quantity of times that the value of the current on the transformer reaches a specified current threshold, and when the quantity of times that the value of the current on the transformer reaches the specified current threshold is N, controlling the main power transistor to be turned on, where N is a positive odd number.

A person skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the following claims of this application and their equivalent technologies.

The invention claimed is:

1. A converter, comprising:
an input direct current (DC) power supply;
a main power transistor;
an auxiliary power transistor;
a first capacitor;
a transformer; and
a controller;
wherein the first capacitor is connected in series to the transformer to form a series circuit, the series circuit is connected in parallel to a source and a drain of the auxiliary power transistor, a drain of the main power transistor is connected to the source of the auxiliary power transistor, a source of the main power transistor is connected to either an input positive electrode or an input negative electrode of the input DC power supply, the drain of the auxiliary power transistor is connected to the other electrode of the input DC power supply, and the input negative electrode of the input DC power supply is grounded;
wherein the controller is configured to monitor a value of a current on the transformer after the auxiliary power transistor is turned off for a preset duration of time to obtain a quantity of times that the value of the current on the transformer reaches a current threshold, and in response to the quantity of times that the value of the current on the transformer reaches the current threshold being N, control the main power transistor to be turned on, wherein N is a positive odd number; and
wherein the current threshold is a current interval that includes an upper current threshold and a lower current threshold, and wherein the quantity of times that the value of the current on the transformer reaches the current threshold is a quantity of times that the current on the transformer reaches the upper current threshold and the lower current threshold.

2. The converter according to claim 1,
wherein the transformer comprises a primary-side winding and a secondary-side winding, and a dotted terminal of the primary-side winding and a dotted terminal or an undotted terminal of the secondary-side winding are located on a same side of the transformer; and
wherein monitoring the value of the current on the transformer comprises monitoring the value of the current on the primary-side winding of the transformer.

3. The converter according to claim 2, wherein the primary-side winding comprises a magnetic inductor and a leakage inductor, and the monitoring the value of the current on the transformer comprises:
monitoring a value of a magnetic inductance current on the magnetic inductor of the primary-side winding of the transformer; or
monitoring a value of a leakage inductance current on the leakage inductor of the primary-side winding of the transformer.

4. The converter according to claim 1,
wherein the controller further comprises a current monitoring circuit, a quantity monitoring circuit, and a main power transistor control circuit;
wherein the current monitoring circuit is configured to monitor the value of the current on the transformer;
wherein the quantity monitoring circuit is configured to obtain the quantity of times that the value of the current on the transformer reaches the specified current threshold, and in response to the quantity of times that the value of the current on the transformer reaches the current threshold being N, send a drive signal for the main power transistor control circuit; and
wherein the main power transistor control circuit is configured to control, based on the drive signal, the main power transistor to be turned on.

5. The converter according to claim 1,
wherein the converter further comprises a second capacitor; and
wherein two terminals of the second capacitor are respectively connected to the input positive electrode and the input negative electrode of the input DC power supply.

6. A converter control method, applied to a converter, wherein the converter comprises an input direct current (DC) power supply, a main power transistor, an auxiliary power transistor, a first capacitor, and a transformer, the method comprising:
monitoring a value of a current on the transformer after the auxiliary power transistor is turned off for a preset duration of time to obtain a quantity of times that the value of the current on the transformer reaches a current threshold; and
in response to the quantity of times that the value of the current on the transformer reaches the current threshold being N, controlling the main power transistor to be turned on, wherein N is a positive odd number;
wherein the first capacitor is connected in series to the transformer to form a series circuit, the series circuit is connected in parallel to a source and a drain of the auxiliary power transistor, a drain of the main power transistor is connected to the source of the auxiliary power transistor, a source of the main power transistor is connected to either an input positive electrode or an input negative electrode of the input DC power supply, the drain of the auxiliary power transistor is connected to the other electrode of the input DC power supply, and the input negative electrode of the input DC power supply is grounded; and wherein the current threshold is a current interval that includes an upper current threshold and a lower current threshold, and wherein the quantity of times that the value of the current on the transformer reaches the current threshold is a quantity of times that the current on the transformer reaches the upper current threshold and the lower current threshold.

7. A power adapter, comprising the converter according to claim 1,
wherein the power adapter further comprises an alternating current-to-direct current (AC/DC) conversion circuit and a filter circuit, and the filter circuit is separately connected to the AC/DC conversion circuit and the converter;
wherein the AC/DC conversion circuit is configured to convert an alternating current in a power grid into a direct current;
wherein the converter is configured to provide a DC voltage for a load device; and
wherein the filter circuit is configured to filter out noise in the input DC power supply and the converter.

8. A converter, comprising:
an input direct current (DC) power supply;
a main power transistor;
an auxiliary power transistor;
a first capacitor;
a transformer; and
a controller;
wherein a drain of the main power transistor is connected to one end of the transformer, a source of the main power transistor is connected to either an input positive electrode or an input negative electrode of the input DC power supply, the other end of the transformer is connected to the other electrode of the input DC power supply, the first capacitor is connected in series to the auxiliary power transistor to form a series circuit, and the series circuit is connected in parallel to the two ends of the transformer;
wherein the controller is configured to monitor a value of a current on the transformer after the auxiliary power transistor is turned off for a preset duration of time to obtain a quantity of times that the value of the current on the transformer reaches a current threshold, and in response to the quantity of times that the value of the current on the transformer reaches the current threshold being N, control the main power transistor to be turned on, wherein N is a positive odd number; and
wherein the current threshold is a current interval that includes an upper current threshold and a lower current threshold, and wherein the quantity of times that the value of the current on the transformer reaches the current threshold is a quantity of times that the current on the transformer reaches the upper current threshold and the lower current threshold.

9. The converter according to claim 8,
wherein the transformer comprises a primary-side winding and a secondary-side winding, and a dotted terminal of the primary-side winding and an undotted terminal of the secondary-side winding are located on a same side of the transformer; and
wherein monitoring the value of the current on the transformer comprises monitoring the value of the current on the primary-side winding of the transformer.

10. The converter according to claim 9, wherein the primary-side winding comprises a magnetic inductor and a leakage inductor, and the monitoring the value of the current on the transformer comprises:
monitoring a value of a magnetic inductance current on the magnetic inductor of the primary-side winding of the transformer; or
monitoring a value of a leakage inductance current on the leakage inductor of the primary-side winding of the transformer.

11. The converter according to claim 8,
wherein the controller further comprises a current monitoring circuit, a quantity monitoring circuit, and a main power transistor control circuit;
wherein the current monitoring circuit is configured to monitor the value of the current on the transformer;
wherein the quantity monitoring circuit is configured to obtain the quantity of times that the value of the current on the transformer reaches the specified current threshold, and in response to the quantity of times that the value of the current on the transformer reaches the current threshold being N, send a drive signal for the main power transistor control circuit; and
wherein the main power transistor control circuit is configured to control, based on the drive signal, the main power transistor to be turned on.

12. The converter according to claim 8,
wherein the converter further comprises a second capacitor; and
wherein two terminals of the second capacitor are respectively connected to the input positive electrode and the input negative electrode of the input DC power supply.

13. A converter control method, applied to a converter, wherein the converter comprises an input direct current (DC) power supply, a main power transistor, an auxiliary power transistor, a first capacitor, and a transformer, the method comprising:
monitoring a value of a current on the transformer after the auxiliary power transistor is turned off for a preset duration of time to obtain a quantity of times that the value of the current on the transformer reaches a current threshold; and
in response to the quantity of times that the value of the current on the transformer reaches the current threshold being N, controlling the main power transistor to be turned on,
wherein N is a positive odd number;
wherein a drain of the main power transistor is connected to one end of the transformer, a source of the main power transistor is connected to either an input positive electrode or an input negative electrode of the input DC power supply, the other end of the transformer is connected to the other electrode of the input DC power supply, the first capacitor is connected in series to the auxiliary power transistor to form a series circuit, and the series circuit is connected in parallel to the two ends of the transformer; and
wherein the current threshold is a current interval that includes an upper current threshold and a lower current threshold, and wherein the quantity of times that the value of the current on the transformer reaches the current threshold is a quantity of times that the current on the transformer reaches the upper current threshold and the lower current threshold.

14. A power adapter, comprising the converter according to claim 8,
wherein the power adapter further comprises an alternating current-to-direct current (AC/DC) conversion circuit and a filter circuit, and the filter circuit is separately connected to the AC/DC conversion circuit and the converter;
wherein the AC/DC conversion circuit is configured to convert an alternating current in a power grid into a direct current;
wherein the converter is configured to provide a DC voltage for a load device; and
wherein the filter circuit is configured to filter out noise in the input DC power supply and the converter.

15. The method according to claim 6,
wherein the transformer comprises a primary-side winding and a secondary-side winding, and a dotted terminal of the primary-side winding and a dotted terminal or an undotted terminal of the secondary-side winding are located on a same side of the transformer; and
wherein monitoring the value of the current on the transformer comprises monitoring the value of the current on the primary-side winding of the transformer.

16. The method according to claim 15, wherein the primary-side winding comprises a magnetic inductor and a leakage inductor, and wherein monitoring the value of the current on the transformer comprises:
monitoring a value of a magnetic inductance current on the magnetic inductor of the primary-side winding of the transformer; or
monitoring a value of a leakage inductance current on the leakage inductor of the primary-side winding of the transformer.

17. The method according to claim 13,
wherein the transformer comprises a primary-side winding and a secondary-side winding, and a dotted terminal of the primary-side winding and a dotted terminal or an undotted terminal of the secondary-side winding are located on a same side of the transformer; and
wherein monitoring the value of the current on the transformer comprises monitoring the value of the current on the primary-side winding of the transformer.

18. The method according to claim 17, wherein the primary-side winding comprises a magnetic inductor and a leakage inductor, and wherein monitoring the value of the current on the transformer comprises:
monitoring a value of a magnetic inductance current on the magnetic inductor of the primary-side winding of the transformer; or
monitoring a value of a leakage inductance current on the leakage inductor of the primary-side winding of the transformer.

* * * * *